US010050795B2

(12) United States Patent
Cidon et al.

(10) Patent No.: US 10,050,795 B2
(45) Date of Patent: Aug. 14, 2018

(54) ROBUST RESTORATION OF PASSPHRASES FROM PARTIAL INFORMATION

(71) Applicant: Barracuda Networks, Inc., San Jose, CA (US)

(72) Inventors: Israel Cidon, Palo Alto, CA (US); Asaf Cidon, San Francisco, CA (US); Lior Gavish, San Francisco, CA (US)

(73) Assignee: Barracuda Networks, Inc., Campbell, CA (US)

( * ) Notice: Subject to any disclaimer, the term of this patent is extended or adjusted under 35 U.S.C. 154(b) by 176 days.

(21) Appl. No.: 15/077,965

(22) Filed: Mar. 23, 2016

(65) Prior Publication Data

US 2017/0033936 A1    Feb. 2, 2017

Related U.S. Application Data

(60) Provisional application No. 62/138,349, filed on Mar. 25, 2015.

(51) Int. Cl.
| | |
|---|---|
| *H04L 9/32* | (2006.01) |
| *H04L 9/14* | (2006.01) |
| *H04L 9/08* | (2006.01) |
| *H04L 29/06* | (2006.01) |

(52) U.S. Cl.
CPC .......... *H04L 9/3271* (2013.01); *H04L 9/0894* (2013.01); *H04L 9/14* (2013.01); *H04L 9/3226* (2013.01); *H04L 9/3247* (2013.01); *H04L 63/083* (2013.01)

(58) Field of Classification Search
CPC ..... H04L 9/0816; H04L 9/0819; H04L 9/085; H04L 9/0894; H04L 9/3226; H04L 9/3236; H04L 9/3247; H04L 9/3271; H04L 63/083; H04L 2463/081
See application file for complete search history.

(56) References Cited

PUBLICATIONS

Ellison et al., Protecting Secret Keys with Personal Entropy, Elsevier Science, 2000.*
Frykholm et al., Error-Tolerant Password Recovery, ACM, 2001.*
McEliece et al., On Sharing Secrets and Reed-Solomon Codes, ACM, 1981.*
Sathiamoorthy, Dummies Guide to Erasure Coding, 2012.*
Shamir, How to Share a Secret, ACM, 1979.*

\* cited by examiner

*Primary Examiner* — Minh Dinh (57) ABSTRACT

Non-transitory computer readable medium that may store instructions that once executed by a computer may cause a computer to receive or generate multiple security questions, receive multiple security answers that were provided by an entity in response to the multiple security questions, receive or generate redundant information and calculate the passphrase by applying an error correction process on the redundant information and the multiple security answers; wherein the error correction process is configured to correct up to a predefined number of erroneous security answers.

12 Claims, 7 Drawing Sheets

ROBUST RESTORATION OF PASSPHRASES FROM PARTIAL INFORMATION

RELATED APPLICATIONS

This application claims priority from U.S. provisional patent Ser. No. 62/138,349 filing date Mar. 25, 2015 which is incorporated herein by reference.

BACKGROUND

Many cryptographic systems require a user to remember a secret, represented by a complex string of characters that cannot be shared with the encryption service. This secret string or passphrase is typically the initial information from which a secret (private or symmetric) encryption key is derived and is used to encrypt other secrets such as encryption keys that are stored as part of the encrypted information itself or with untrusted services. The user can decrypt the user's own keys using the secret passphrase. Another advantage of a passphrase protected key is that the owner may change the passphrase and re-encrypt the key without replacing the key itself. Consequently, the secret string cannot be recovered or reset by anybody else except the owner. On one hand, the passphrase is the single private secret used to protect important information such as encryption keys so it cannot be shared with others or stored in places it can be compromised (email, cloud storage, mobile devices etc.). On the other hand, while being totally safe, losing or forgetting this secret string may cause permanent data or access loss. A common example is related to the ability of users to encrypt their data within a public storage system without sharing the encryption keys with the service vendor. This is required many times as the information can leak to the vendor's employees, to sophisticated hackers and intruders that hack the service provider or be a subject of subpoena without the knowledge of the data owner.

Such a secret string, which is typically called a passphrase, is typically a sequence of words that has no chance being derived using a brute force or dictionary cryptographic attack. In many cases, it is composed as a sequence of words and numbers that can be remembered together as a full sentence (e.g. threecatdayhapynesstotheplanet1970, that may be reconstructed from the 1970 song, "joy to the world" by the group "three dog night"). Such long and unique strings would not be likely to be broken by a brute force attacker even if the attacker knows a-priori information about the target (e.g., that "Joy to the World" is the favorite song on the target's mobile device). Other systems use the term password and passphrase interchangeably. Some systems will store for a passphrase "reminder" that the user designates, like "a modification to my favorite Canadian song" that the user can recover if they forget the pass-phrase.

For example, the widely used cryptographic standard OpenPGP requires that a user make up a passphrase that must be entered whenever decrypting or signing messages. Internet services like Hushmail provide free encrypted e-mail or file sharing services, but the security present depends almost entirely on the quality of the chosen passphrase.

Typical advice for choosing a passphrase includes suggestions such as:

Long enough to be hard to guess

Not a famous quotation from literature, holy books, etc.

Hard to guess by intuition—even by someone who knows the user well

Easy to remember and type accurately

For better security, any easily memorable encoding at the user's own level can be applied.

Not reused between sites, applications and other different sources.

In most systems, forgetting the passphrase will cause a loss of information. For example, the Google chrome passphrase reset includes the following warning:

"This step will delete all previously synced data (bookmarks, apps, extensions, etc.) that is stored in your Google Account.".

Github uses passphrase to maintain secure SSH connection. The Github passphrase reset includes the following warning: "If you lose your SSH key passphrase, there's no way to recover it. You'll need to generate a brand new SSH keypair or switch to HTTPS cloning so you can use your GitHub password instead."

Other systems try to help you not forget the passphrase by letting the users store hints or reminders to their passphrase and retrieving these hints if the user fails to remember the pass-phrase/password.

The following is quotations from several "zero knowledge" services that do not store the user secret string (they use different terminology to name this non-stored secret string).

SpiderOak is an encrypted "zero knowledge" file sharing service: "What if I forget my SpiderOak password?

First, when logging into your account be sure you're entering the correct username with the correct capitalization or it will not be accepted.

If you created a 'Hint' for your password when you first made your account, you can have that hint sent to your e-mail address by entering your username (not your email address) here:

https://spideroak.com/forgot_password

However, if you can't reset your password from another machine and the hint has still not helped you remember your password, then your only option is to open a new account. Here at SpiderOak we take our 'Zero-Knowledge' privacy policy very seriously, so we never have any knowledge of your password and no way to retrieve or reset it, even in emergencies. It's our way of ensuring that our customers' data is always completely secure . . . even from ourselves!"

MS Windows offers to store a hint to your password. This hint will be visible by anybody who tries to login.

Certain systems will not rely on human memory and store the passphrase on a personal device (e.g. the client size encryption systems like BoxCryptor or Google two factor authentication passcodes). Unfortunately, personal devices may be lost, stolen or become non-operational due to accidents or hardware failures.

Using security questions and answers as passphrase alternatives

Security questions are used as authenticators by banks, cable companies and wireless providers as an extra security layer since at least the early 20th century.

In the 2000s, security questions came into widespread use on the Internet as a form of self-service password reset. As such, and similarly to secret strings or passphrases, users must remember the exact spelling and sometimes even case of the answers they provide, which poses the threat that more answers will be written down, exposing them to physical theft.

Due to the commonplace nature of social-media, many of the older traditional security questions are no longer useful or secure. It is important to remember that a security question is just another password. Therefore, a security question should not include any information readily available on social media websites, while remaining simple, memorable, difficult to guess, and constant over time.

Security specialist Bruce Schneier questions the usefulness of security questions. Since they are public facts about a person, they are easier to guess for hackers than passwords. Users that are aware of this problem, often times create faux, hard to guess answers to the questions, but then run at the risk of forgetting the answers, thus defeating the purpose and creating an inconvenience.

It is quite evident that a standard set of security answers can be translated to passphrase or a secret string. The passphrase is composed by concatenating the answers to a single phrase. Special character or standard delimiters can separate the answers if there is a need to go back from the passphrase to the original answers. Similarly, the security questions themselves can be treated as a passphrase hints or reminders. In other words, in a system where security answers are treated as secret, private passphrase, the answers will not be stored by the cloud service. However, the security questions can be stored there as a reminder and sent to the user as a passphrase hint.

It is clear that while a set of security question can replace a passphrase and be more protected against loss resulting from a weak human memory, the inability of users to backup securely security answers or to remember the non-trivial answers to security questions still creates the potential loss of protected data is still the main obstacles for totally relying on secret answers to a set of security questions.

SUMMARY

According to an embodiment of the invention there may be provided a computer implemented method for generating a passphrase, the method may include receiving or generating, by a computer, multiple security questions; receiving, by the computer, multiple security answers that were provided by an entity in response to the multiple security questions; receiving or generating, by the computer, redundant information; and calculating the passphrase by applying, by the computer, an error correction process on the redundant information and the multiple security answers; wherein the error correction process is configured to correct up to a predefined number of erroneous security answers.

The computer implemented method may include determining access credentials of the entity based on the passphrase.

The computer implemented method may include calculating, by the computer, the redundant information in response to correct security answers.

The calculating of the passphrase may include applying a cryptographic one way hash on the multiple security answers to provide multiple calculated hash values; and comparing the multiple calculated hash values to multiple hash values associated with the correct security answers to determine which security answers are correct.

The calculating of the passphrase may include detecting unanswered security questions and reconstructing, during the calculating the passphrase, security answers to the unanswered security questions.

According to an embodiment of the invention there may be provided computer implemented method may include receiving or calculating a signature of the passphrase; evaluating different hypotheses about erroneous security answers to provide multiple suggested passphrases; calculating, for each suggested passphrase of the multiple suggested passphrases, a suggested signature thereby providing multiple suggested signatures; and searching for a matching suggested signature, out of the multiple suggested signatures, that matches the signature of the passphrase; selecting a hypothesis associated with the matching suggested signature; and correcting erroneous security answers within the selected hypothesis to provide the passphrase.

The computer implemented method may include retrieving at least one security answer from another computer.

The computer implemented method may include retrieving a plurality of security answers, out of the multiple security answers, from a plurality of other computers.

The computer implemented method may include retrieving at least a portion of the redundant information from another computer.

The computer implemented method may include retrieving plurality of portions of the redundant information from a plurality of other computers.

The computer implemented method may include storing only some of the security answers in the computer.

The computer implemented method may include storing only a portion of the redundant information in the computer.

According to an embodiment of the invention there may be provided a Non-transitory computer readable medium that may store instructions that once executed by a computer causes a computer to: receive or generate multiple security questions; receive multiple security answers that were provided by an entity in response to the multiple security questions; receive or generate redundant information; and calculate the passphrase by applying an error correction process on the redundant information and the multiple security answers; wherein the error correction process is configured to correct up to a predefined number of erroneous security answers.

BRIEF DESCRIPTION

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

There are provided systems, method, non-transitory computer readable media that build a passphrase from a set of security answers combined using concepts from the field of error correction codes to provide a framework where a reasonable tolerance to human memory loss is maintained by the system while the probability brute force attacks on the answers remain very low.

The basic mechanism used is erasure codes such as Reed Solomon codes, Tornado codes or Raptor codes. In these codes, there are K original words, M redundant (error correcting) words can be added to form K+M=N words. Any subset of k words out of the total n is enough to reconstruct the original k. A good introduction to the concept of erasure codes can be found in http://smahesh.com/blog/2012/07/01/dummies-guide-to-erasure-coding/.

In our example each answer is a secret word that is a part of a multi-word passphrase. If we have 7 answers than then K=7. We can create using the erasure code mechanism M=3 extra redundant words (termed syndrome by the erasure code theory). These M redundant words+the K security questions are stored with the server. When the user needs to reconstruct her passphrase, the user requests the server for the security question and the M redundant words. Now the user can mark up to M of the security answers as forgotten, these unknown answers or words will be treated as erased words. The error correction program on the computer will compute all the K original answers from the K−M answered questions and the M additional redundant words that were supplied by the server. Note that in order to keep the passphrase secret from the server, K>M.

Selecting Questions and Answers

In our example each answer is a secret word that is a part of a multi-word passphrase. If we have 5 answers than then k=5.

Example: A set of 5 question (k=5). Note that the answers do not necessarily answer the questions. The questions are only reminders or hints to a complex, not trivial to guess, answer.

In this example, 8 last characters from each answer will be taken with no spaces and no capital letters to form the passphrase of 40 characters. The first till fourth questions are referred to as Q1, Q2, A3 and Q4. The first till fourth answers are referred to as A1, A2, A3 and A4.
Q1: What is your favorite password?
A1: jq0W7dh&Uz
Q2: What is your favorite slogan?
A2: 1 for all, all for 1
Q3: What is your favorite 8 number pin?
A3: 96830177
Q4: What is your favorite star?
A4: Star of Texas
Q5: What is your primary bank account number?
A5: 316AZ916873
The resulting passphrase is: 0w7dh&uzlallfor196830177roftexasaz916873

If conducted carefully, this procedure can result with a very strong passphrase which supersedes the conventional ability of users to create safe passphrases. This will be true even if the list of questions or hints is known to an attacker (assuming the cloud vendor is compromised). Note that the list of questions can be prepared by the vendor, selected by the user from a large number of option prepared by the vendor or be prepared by the user and only stored by the cloud vendor. It is also more easily reconstructed given the list of hints.

Applying Erasure Coding Technics for Security Answers

In the following, we assume that the security answers are all of the same size. If they are not, we assume that the system will normalize the size of the answer by applying a function that maps the answers to the preferred size. For example, select a nominal number of characters or bits from each answer or applying a known hash function on the answer and selecting the correct number of bits from the hash. In the previous example, 8 characters were derived from the end of each answer.

Consequently, we can look on the answers as N values taken from a finite field. These values can now be an input for standard erasure code techniques, such as Reed Solomon or Raptor Codes. We assume that the user can select the "erasure" parameter—M, in other words how many question can be skipped out of the N. We also assume that M is significantly smaller than N/2.

There are two versions to the application of the error correction mechanism. In the first version, the user knows which answers she wants to skip (equivalent to an erasure) and which answer she wants to answer correctly. In this version, users cannot answer any question incorrectly; just skip up to M questions without answering it. In this case the application of the erasure code system is straight forward as all N answers can be derived by a simple application of the erasure correction mechanism. Each skipped answer will be considered as an erased word. The second version will be described in the following subsection.

Applying Erasure Codes for Wrong Answers

Server Side Assistance

The simplest and most common way to check the correctness of an answer without knowing the answer is to store on the server, in additions to each question, a cryptographic one-way hash of the corresponding answer. In this way, each answer can be verified but there is no practical way to reverse the one way function and to derive the answer. Similar to password protection, it is advisable to use for each answer a cryptographic salt. A salt is random data that is used as an additional input to a one-way function that hashes a password or a short string. The primary function of salts is to defend against dictionary attacks versus a list of potential answers hashes and against pre-computed rainbow table attacks.

A new salt is randomly generated for each answer. In a typical setting, the salt and the answer are concatenated and processed with a cryptographic hash function, and the resulting output (but not the original answer) is stored with the salt in the server database. Hashing allows for answer authentication while defending against the compromise of the plaintext answer in the event that the database is somehow compromised.

The use of the answer hashes is simple. When the user enters an answer it is hashed with the corresponding salt and compared to the corresponding hashed answer stored in the database. This operation can be done on the server or on the device by exporting the corresponding hashed values and salts from the server to the device.

Detecting Wrong Answers Using Brute Force Computation

Keeping at the server a hash and a salt for all answers may create some risk as answers are short and each of the answer can be prone to brute force attack. Another way to mitigate this problem is to keep in the server a single hash and salt for the full passphrase. The idea is that for reasonable parameters (K<10, M<3) the application can compute all the combination of M wrong answers, compute the resulted passphrase (using the extra syndrome symbols retrieved from the server) until it finds a combination where the salted hash of the passphrase matches the one stored in the server. In order to cut down the compute time, the application will start with m=0, errors (assuming all answers are correct) and if fails, increases m by one (for m=1 it assumes there is one wrong answers and goes through the K possibilities, for m=2 it assumes 2 answers are wrong and it goes through the K*(K−1) possibilities, etc) until it reached m=M. The total number of possibilities is in the order of $K^M$. For K=10 and M=3. This is less than 1000 combinations that need to be checked.

Distributing Answers Across a Group of Users and/or Devices

The previous scheme has located the questions and the extra correction symbols at the server. One problem with this scheme is that passphrase can be lost if a person forgets more than M answers or the original person is not available (say was separated from a company) to answer the questions. It is possible to spread away these answers (original words) to other people. The term people or users are used in a generic way. These can also be different user devices each holding one or more answers.

For example, if you give each of the original K answers to a different person or place it on a different device, then any subgroup of K-M people will be able to derive the passphrase with the assist of the server that hosts the M redundant symbols. However, since these questions maybe personal in nature maybe better to produce additional K or more redundant words so that nobody will be actually exposed to the original questions and answers.

The server may separate the access of the account owner from those of the authorized group. It will not supply the original questions back to the authorized group.

Figure 1:
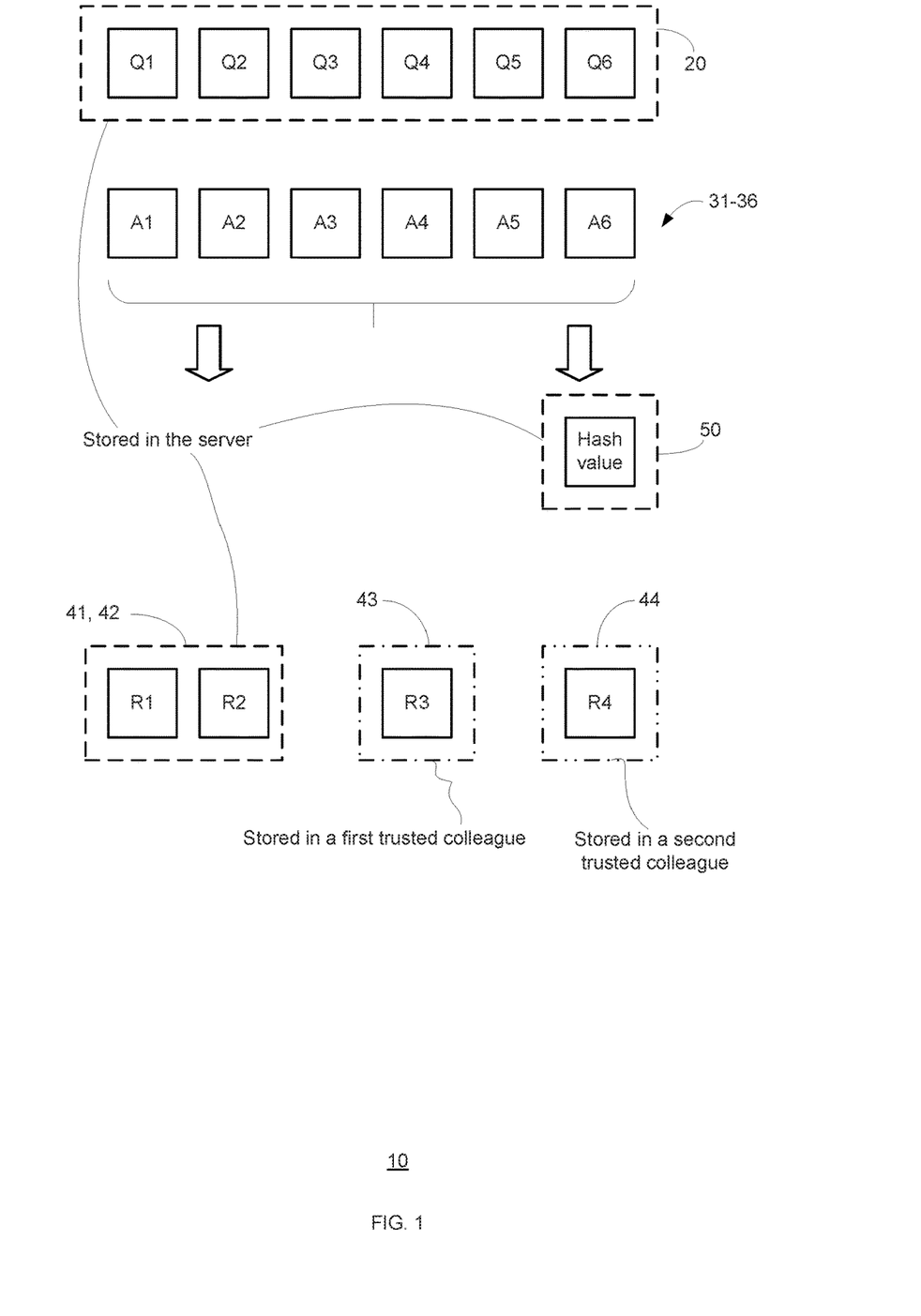
FIG. 1 illustrates various data entities according to an embodiment of the invention.

FIG. 1 illustrates the organization of the data entities where redundant words are spread among the server and trusted colleagues, according to an embodiment of the invention.

The term "trusted" means that the colleague was selected to store redundant information and/or correct answer. The selection can be done in any manner, including random and pseudo-random selection.

Six security questions Q1, Q2, Q3, Q4, Q5 and Q6 collectively denoted 20 are stored on the server.

Six correct security answers A1, A2, A3, A4, A5 and A6 31-36 should be remembered by the user. A signature of the entire passphrase (including the six security answers) such as a hash value 50 of the passphrase is stored in the server.

The redundant information includes four redundant words R1, R2, R3 and R4 (or any four redundant information portions) 41-44.

Redundant words R1 41 and R2 42 are stored on the server.

Redundant word R3 43 is stored outside the server—at a first trusted colleague (any other trusted computer).

Redundant word R4 44 is stored outside the server—at a second trusted colleague (any other trusted computer).

Figure 2:
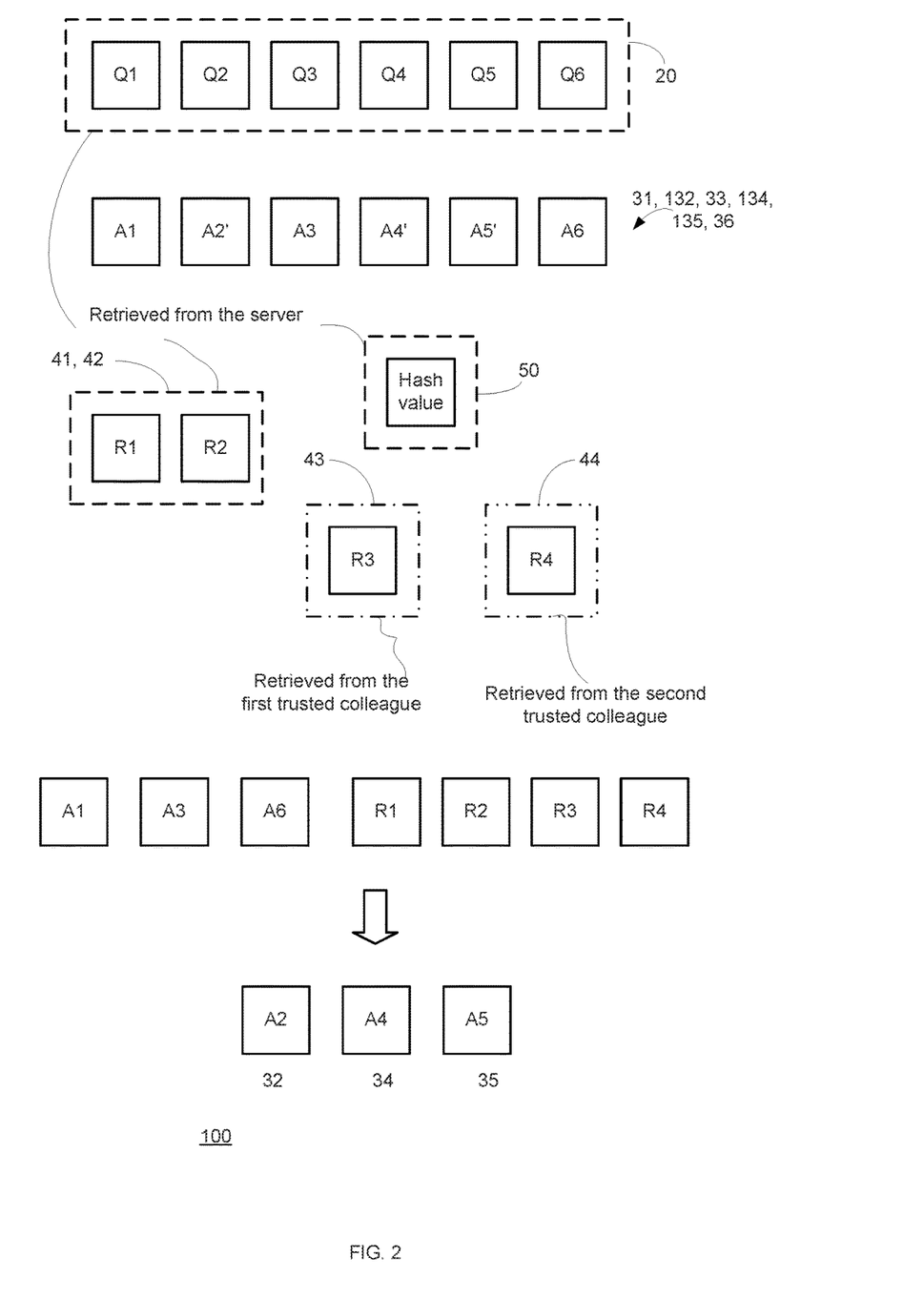
FIG. 2 illustrates various data entities according to an embodiment of the invention.

FIG. 2 illustrates the retrieval of the original security answers from the redundant words that are spread among the server and trusted people according to an embodiment of the invention.

Six security questions Q1, Q2, Q3, Q4, Q5 and Q6 collectively denoted 20 are retrieved from the server.

Six security answers (fed by the user) A1, A2', A3, A4', A5' and A6 31, 132, 33, 134, 135 and 36 are received. First, third, and sixth security answers A1, A3 and A6 are correct and second, fourth and fifth security answers A2', A4' and A5' are erroneous.

Second, fourth and fifth security answers A2', A4' and A5' should be corrected using (a) redundant words R1 41 and R2 42 that are retrieved from the server, (b) redundant word R3 43 that is retrieved from the first trusted colleague, and (c) redundant word R4 44 that is retrieved from the second trusted colleague.

Figure 3:
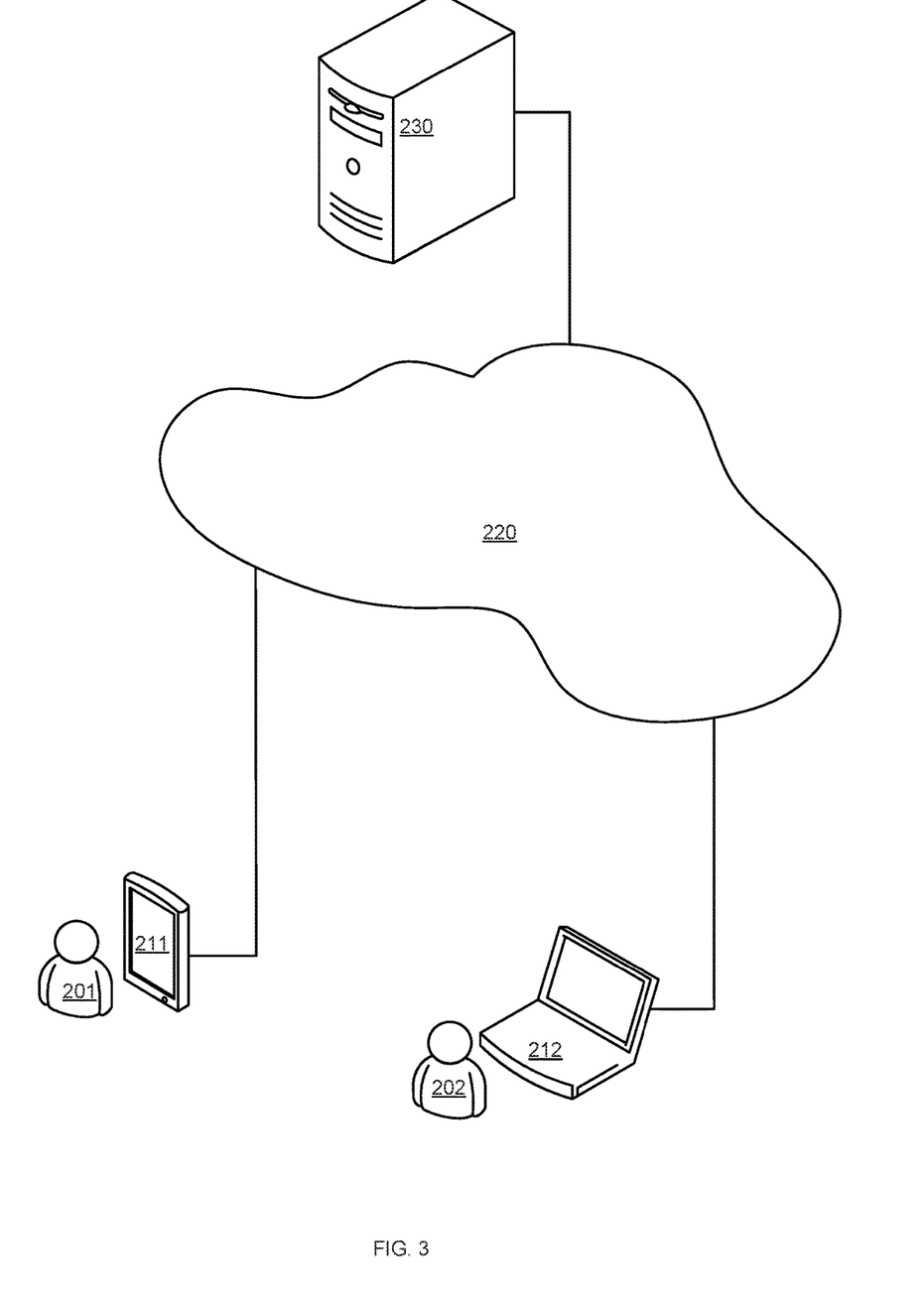
FIG. 3 illustrates a computerized system and its environment according to an embodiment of the invention.

FIG. 3 illustrates server 230, network 220, first user device 211 of first user 201, second user device 212 of second user 202.

The first and second user devices are computerized devices. They may be portable or non-portable electronic devices such as smartphones, mobile phones, laptop computers, gaming devices, desktop computers, media players, and the like.

Network 220 is coupled to server 230, first and second user devices 211 and 212.

Server 230 may be within a could computing environment. Server 230 may be replaced by multiple servers.

Figure 4:
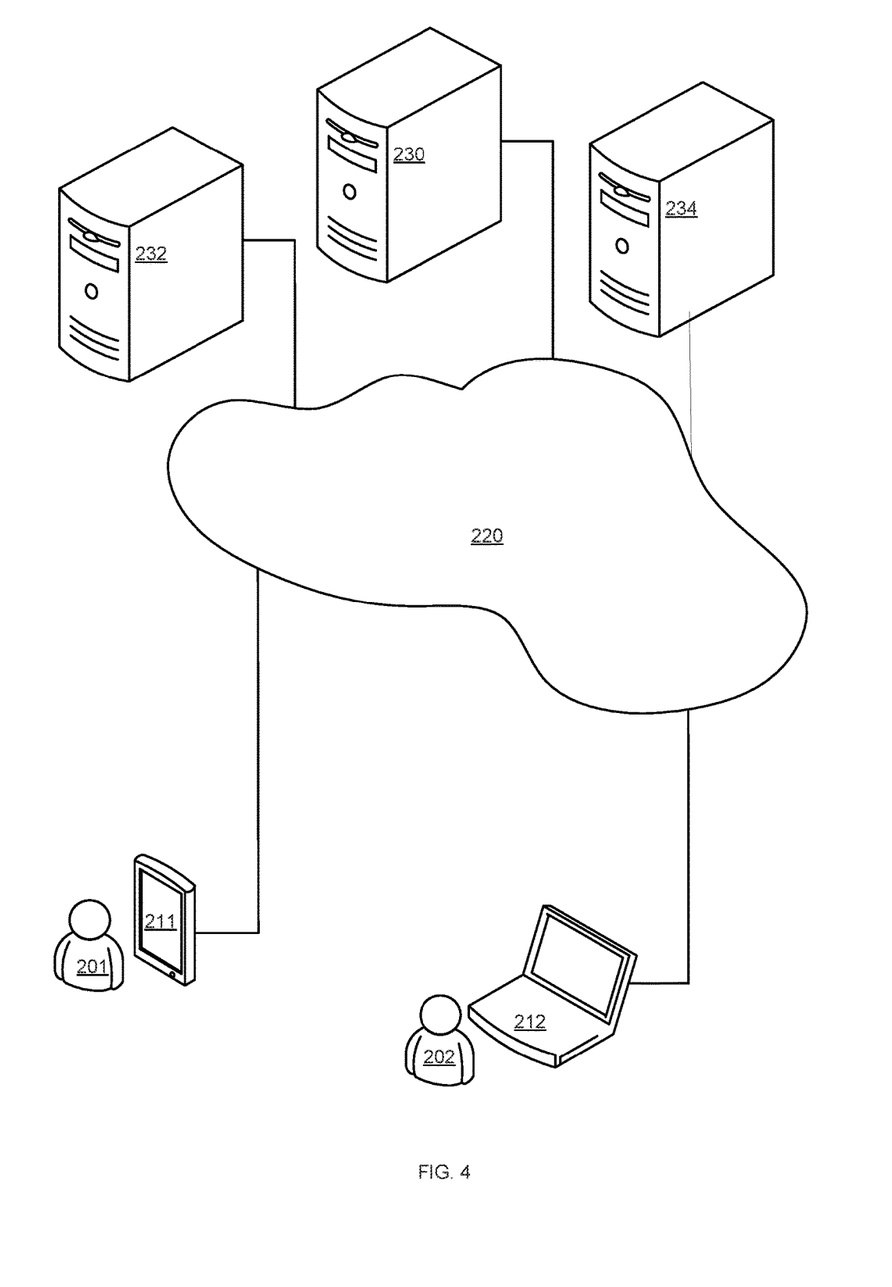
FIG. 4 illustrates a computerized system and its environment according to an embodiment of the invention.

FIG. 4 illustrates multiple servers 230, 232 and 234 instead of server 230. Servers 232 and 234 may be regarded as first and second trusted colleagues. Additionally or alternatively, one or more trusted colleague can include first user device 211 and second user device 212.

Figure 5:
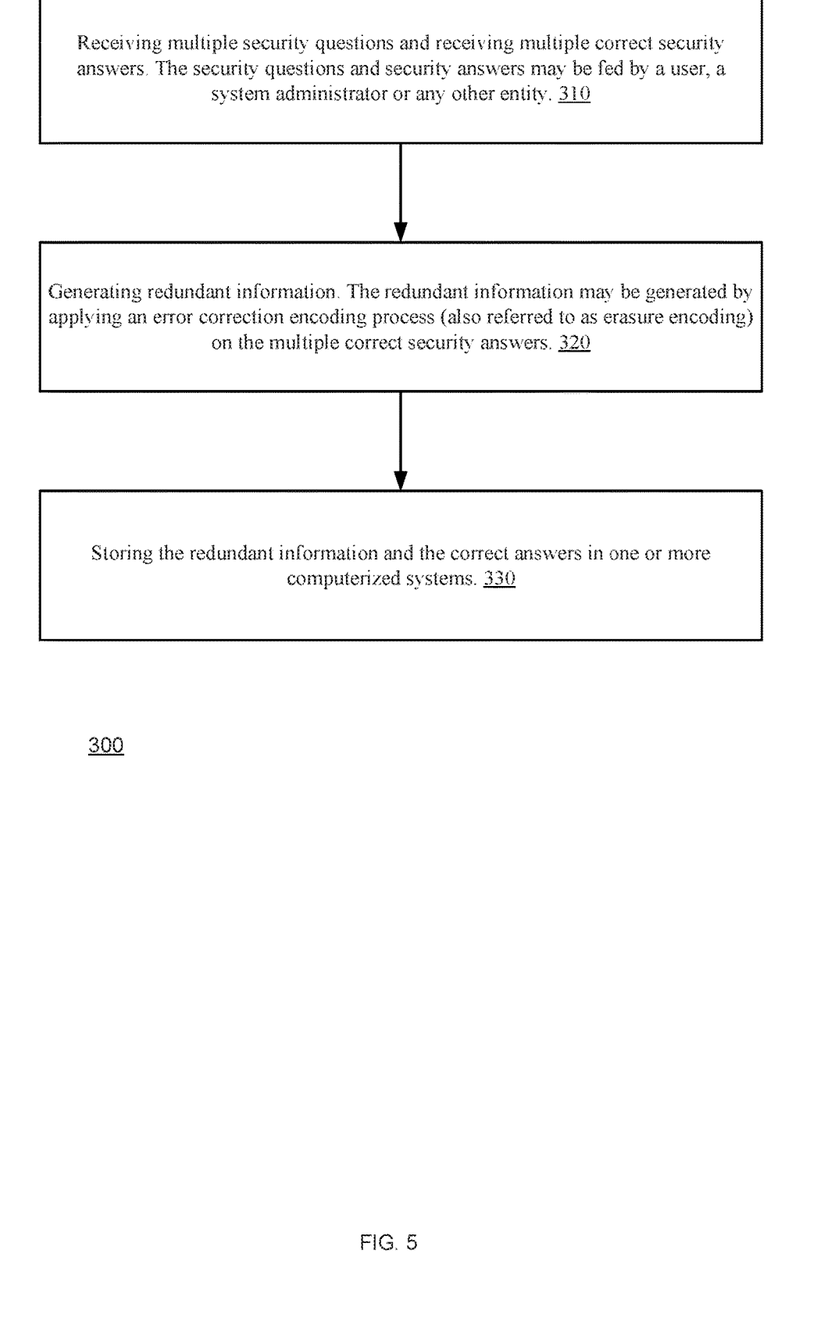
FIG. 5 illustrates a method according to an embodiment of the invention.

FIG. 5 illustrates method 300 according to an embodiment of the invention.

Method 300 may start by step 310 of receiving multiple security questions and receiving multiple correct security answers. The security questions and security answers may be fed by a user, a system administrator or any other entity.

Each security question is associated with a correct security answer.

Step 310 may be followed by step 320 of generating redundant information. The redundant information may be generated by applying an error correction encoding process (also referred to as erasure encoding) on the multiple correct security answers.

The error correction process is configured to correct up to a predefined number of erroneous security answers.

The outcome of step 320 is a passphrase. The passphrase includes multiple portions—each portion may be attributed to a security answer. The passphrase may be used for controlling access to computer resources.

It is noted that the correct securing answers may be further processed (for example normalized to a predefined length, hashed, and the like) before applying the error correction encoding process.

Step 320 may be followed by step 330 of storing the redundant information and the correct answers in one or more computerized systems. This may include transmitting information to another computer, deleting information from the computerized system that executed steps 310 and 320.

Figure 6:
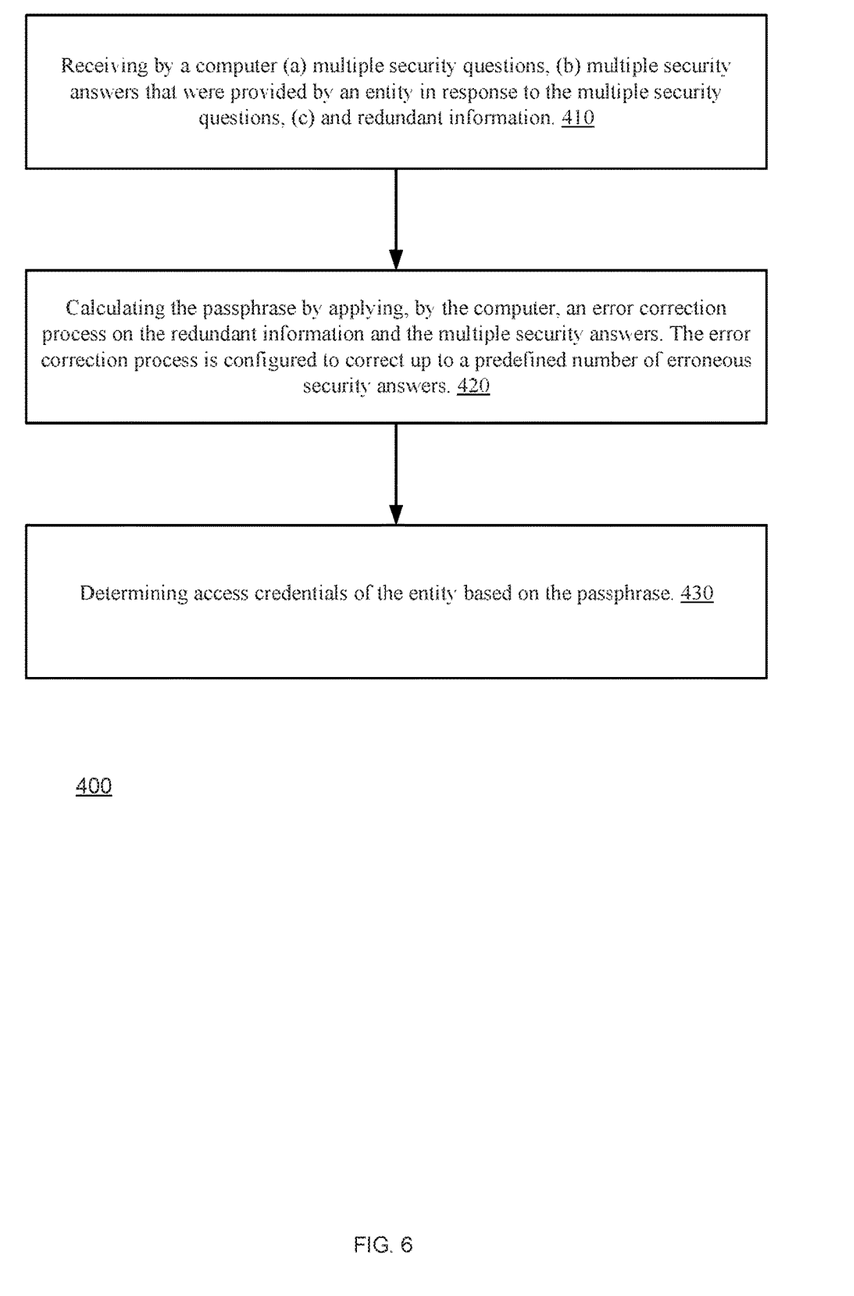
FIG. 6 illustrates a method according to an embodiment of the invention.

Figure 6 illustrates method 400 according to an embodiment of the invention.

Method 400 may start by step 410 of receiving by a computer (a) multiple security questions, (b) multiple security answers that were provided by an entity in response to the multiple security questions, (c) and redundant information.

Step 410 may include retrieving information (such as one or more security questions, one or more portion of redundant information) from another computerized system such as a trusted colleague, another server, a user device, and the like.

Step 410 may be followed by step 420 of calculating the passphrase by applying, by the computer, an error correction process on the redundant information and the multiple security answers. The error correction process is configured to correct up to a predefined number of erroneous security answers.

Step 420 may be followed by step 430 of determining access credentials of the entity based on the passphrase. For example—first user device 211 may grant access or deny access of first user 201 to information stored in server 302.

Figure 7:
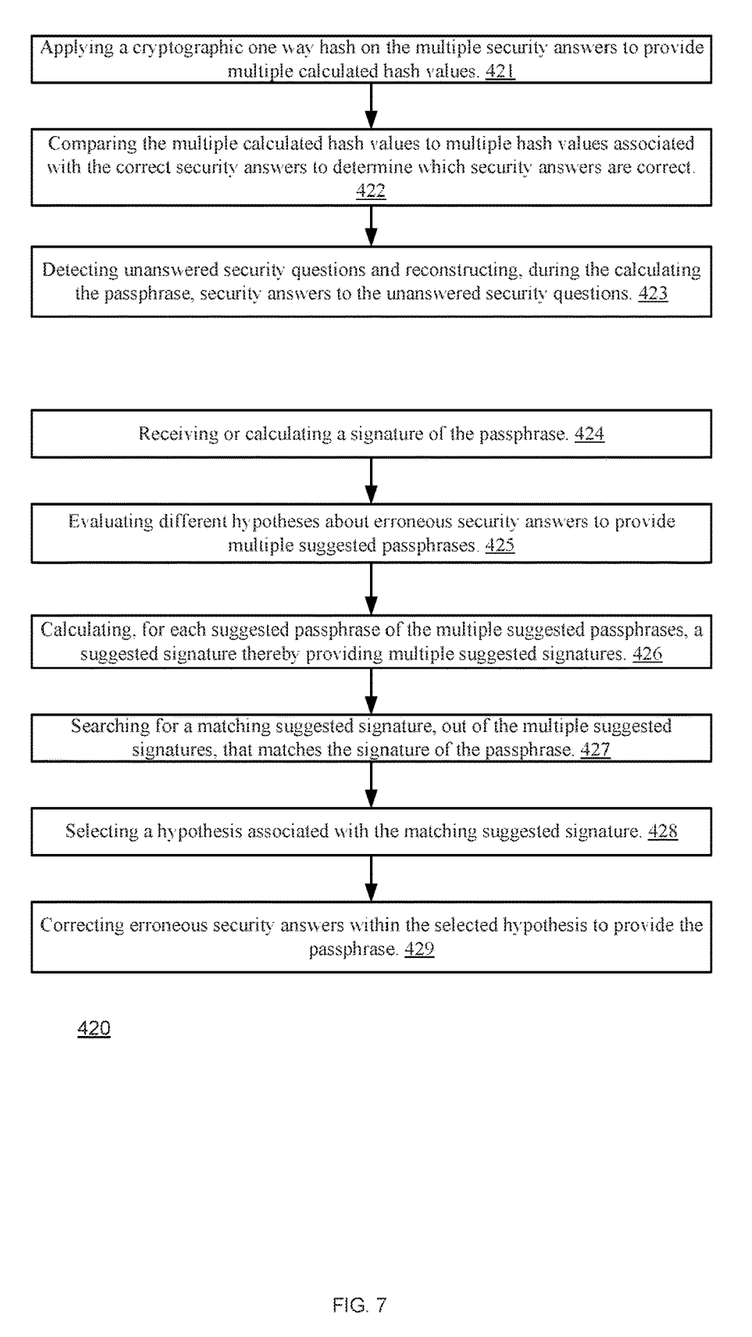
FIG. 7 illustrates various steps according to an embodiment of the invention.

Step 420 may include at least some of steps 421, 422, 423, 424, 425, 426, 427, 428 and 429. These steps are shown in FIG. 7.

Step 421 may include applying a cryptographic one way hash on the multiple security answers to provide multiple calculated hash values.

Step 422 may include comparing the multiple calculated hash values to multiple hash values associated with the correct security answers to determine which security answers are correct.

Step 423 may include detecting unanswered security questions and reconstructing, during the calculating the passphrase, security answers to the unanswered security questions.

Step 424 may include receiving or calculating a signature of the passphrase.

Step 425 may include evaluating different hypotheses about erroneous security answers to provide multiple suggested passphrases.

Step 426 may include calculating, for each suggested passphrase of the multiple suggested passphrases, a suggested signature thereby providing multiple suggested signatures.

Step 427 may include searching for a matching suggested signature, out of the multiple suggested signatures, that matches the signature of the passphrase.

Step 428 may include selecting a hypothesis associated with the matching suggested signature.

Step 429 may include correcting erroneous security answers within the selected hypothesis to provide the passphrase.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A computer implemented method for generating a passphrase, the method comprises:
   receiving, by a computer, multiple security questions;
   receiving, by the computer, multiple security answers that were provided by an entity in response to the multiple security questions;
   receiving, by the computer, redundant information;
   calculating the passphrase by applying, by the computer, an error correction process on the redundant information and the multiple security answers; wherein the error correction process is configured to correct up to a predefined number of erroneous security answers;
   receiving or calculating a signature of the passphrase;
   evaluating different hypotheses about erroneous security answers to provide multiple suggested passphrases;
   calculating, for each suggested passphrase of the multiple suggested passphrases, a suggested signature thereby providing multiple suggested signatures; and
   searching for a matching suggested signature, out of the multiple suggested signatures, that matches the signature of the passphrase;
   selecting a hypothesis associated with the matching suggested signature; and
   correcting erroneous security answers within the selected hypothesis to provide the passphrase.

2. The computer implemented method according to claim 1, comprising determining access credentials of the entity based on the passphrase.

3. The computer implemented method according to claim 1, comprising calculating, by the computer, the redundant information in response to correct security answers.

4. The computer implemented method according to claim 1, wherein the calculating of the passphrase comprises:
   applying a cryptographic one way hash on the multiple security answers to provide multiple calculated hash values; and
   comparing the multiple calculated hash values to multiple hash values associated with the correct security answers to determine which security answers are correct.

5. The computer implemented method according to claim 1, wherein the calculating of the passphrase comprises detecting unanswered security questions and reconstructing, during the calculating the passphrase, security answers to the unanswered security questions.

6. The computer implemented method according to claim 1 comprising retrieving at least one security answer from another computer.

7. The computer implemented method according to claim 1 comprising retrieving a plurality of security answers, out of the multiple security answers, from a plurality of other computers.

8. The computer implemented method according to claim 1 comprising retrieving at least a portion of the redundant information from another computer.

9. The computer implemented method according to claim 1 comprising retrieving plurality of portions of the redundant information from a plurality of other computers.

10. The computer implemented method according to claim 1 comprising storing only some of the security answers in the computer.

11. The computer implemented method according to claim 1 comprising storing only a portion of the redundant information in the computer.

12. A non-transitory computer readable medium that stores instructions that once executed by a computer causes a computer to:

receive multiple security questions;

receive multiple security answers that were provided by an entity in response to the multiple security questions;

receive redundant information;

calculate the passphrase by applying an error correction process on the redundant information and the multiple security answers; wherein the error correction process is configured to correct up to a predefined number of erroneous security answers;

receive or calculate a signature of the passphrase;

evaluate different hypotheses about erroneous security answers to provide multiple suggested passphrases;

calculate, for each suggested passphrase of the multiple suggested passphrases, a suggested signature thereby providing multiple suggested signatures; and search for a matching suggested signature, out of the multiple suggested signatures, that matches the signature of the passphrase;

select a hypothesis associated with the matching suggested signature; and correct erroneous security answers within the selected hypothesis to provide the passphrase.

\* \* \* \* \*